United States Patent Office 2,818,648
Patented Jan. 7, 1958

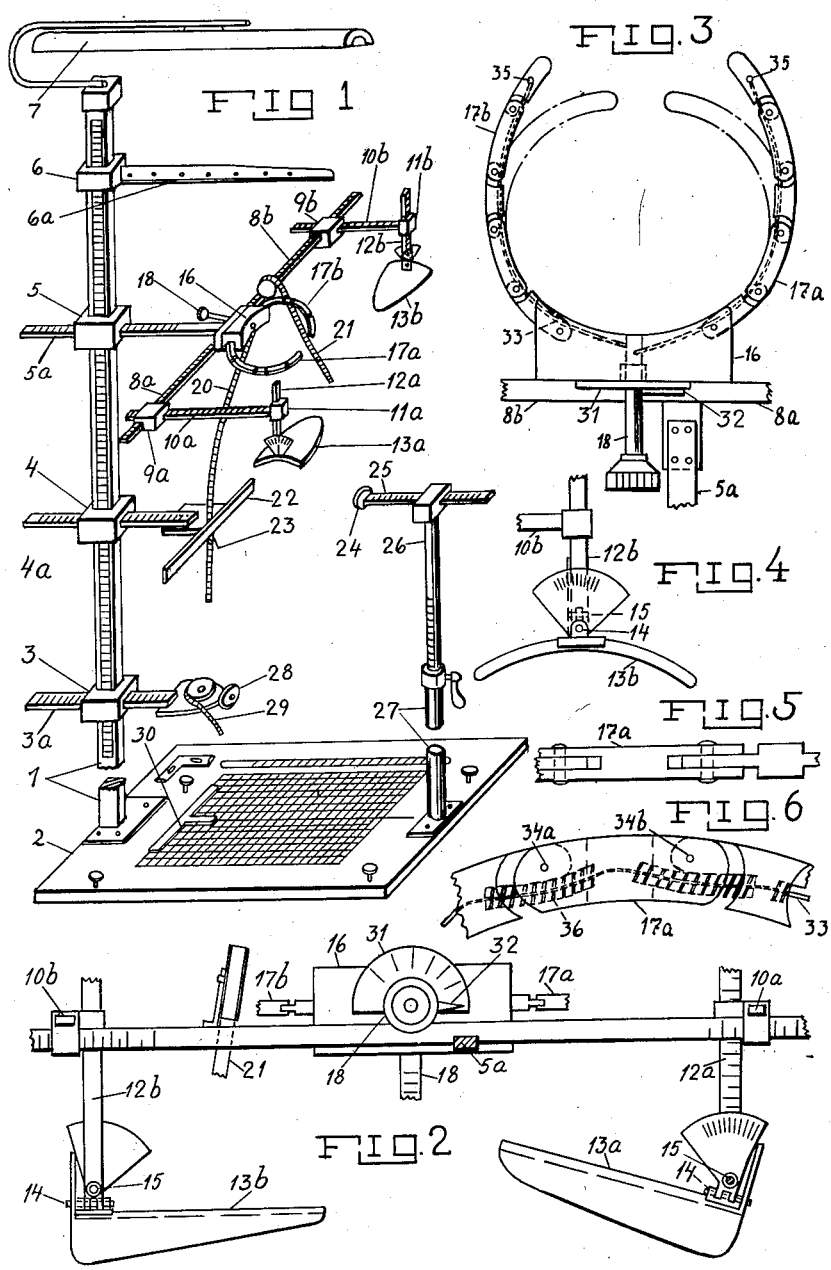

2,818,648
POSTURE MEASURING DEVICE
Hans Rudolf August Jochheim, Gothenburg, Sweden Application April 6, 1956, Serial No. 576,676

5 Claims. (Cl. 33—8)

This invention relates to measuring means for use in the making or alteration of garments.

It is an object of this invention to provide for the taking of measurements with reference to a fixed point defined on the person being measured, said fixed point being chosen to enable the measuring along all three axes of space directly from the point by means of devices having vertically and horizontally shiftable measuring elements associated with measuring tapes where such are suitable.

Another object of this invention is to provide for the taking of measurements from said fixed point to enable the fitting of a garment in reference to posture and inclination of a person's shoulders, regardless of how they differ from each other.

A further object of the invention is to provide improved means for measuring the circumference of the neck.

With these and other objects in view the invention consists in the novel construction of parts to be hereinafter described and claimed.

The invention will be best understood by reference to the accompanying drawing showing the preferred form of construction and in which:

Figure 1 is a perspective view partly broken away of the improved equipment.

Figure 2 is a rear elevation of the shoulder measuring portion thereof.

Figure 3 is a plan view of a part of the said upper portion.

Figure 4 is a side view of a detail of the shoulder measuring device.

Figure 5 is a side view of a portion of the neck measuring device, and

Figure 6 a plan view thereof.

The customary ready made clothes in the clothing business are made according to standard normal-built human bodies without taking in consideration all possible variations. These variations cause much trouble because of the difficulties of marking the clothes to correct for the abnormalities, and the construction according to this invention is intended to facilitate the measuring to obtain an exact fitting of clothing, particularly men's clothes, and an essential feature of this invention is that the measurings for the neck, shoulders, breast and back are all referred to a fixed point of a neck support by means of combined gauges.

The measuring equipment consists of a vertical measuring standard 1 preferably of rectangular section and provided with a foot plate 2. The standard carries a plurality of slides 3, 4, 5 each with a horizontal forward directed and forwardly slidable gauge arm 3a, 4a, 5a, here defined as the waist arm, the back arm and the neck arm. Above the upper slide 5 there is a further slide 6 with a forward directed arm for measuring the height of the person, and the standard is provided above this slide with a lamp 7. The neck arm 5a carries at its free front end a cross bar extending to both sides in a horizontal plane. Each arm 8a, 8b is graduated and carries a slide 9a, 9b, each of which has a graduated arm 10a, 10b slidable therein and directed forward parallel with the neck arm 5a. Each arm 10a, 10b has at its free front end a guide 11a, 11b for a vertical graduated bar 12a, 12b vertically slidable in the guide and carrying at its lower end an arched shoulder locating plate 13a, 13b suitably narrowing towards its one end, the narrowed ends of the shoulder plates directed towards each other. The shoulder plates are carried at their broader ends each by a double bearing consisting of two horizontally directed crossing axle pins 14, 15 permitting each plate to be turned about its central length line to slanting position, as well as to be turned about its cross axle line at the end of the plate so that the narrowed end may be inclined upwards as seen in Figure 2. The slanting as well as the inclined position are to be read off on angle graduations.

Centrally at the cross bar 8a, 8b in front of the neck arm 5a there is attached a neck support 16, from which two arms 17a, 17b extend for measuring the neck. These arms are built up by links and, acted upon by the turning of a shaft 18, are able to closely follow the rounding of the neck to measure the circumference thereof. A pointer 32 attached to the shaft 18 indicates this measure on an empiric scale 31. To bend each separate arm a wire 33 is drawn through the links of the arm passing the fulcrum pins 34a, 34b thereof close to the inner side of the arm. The wire is attached to a pin 35 at the outermost link and is connected to the shaft 18. The wire is drawn through a coil spring 36 (Figure 6) at each joint of the links and the spring extends from a bore in one link to a bore in the next link, and the spring 36 is placed in such a way that it tends to turn the said next link outwards. Because of the counteraction of the springs the curved shape of the arm shown by dashed and dotted lines in Figure 3 is obtained upon tightening the wire by turning shaft 18, and when the wire is slackened the spring pressure will move the arms outwards to the outer position shown in the same figure. The fixed point at the neck support, used as datum point for the measuring, is designated by 16a in Figure 1, and lies in the axis of the neck arm 5a. If suitable the point of the crossing between the neck arm 5a and the cross bar 8a, 8b may be used as datum point, if the neck support is arranged accordingly. In the front of the neck support a tape measure 20 is attached for measuring the back curve of the person, and at the side of the neck support a tape measure 21 with sliding scale is provided for the measuring of the breast curve.

The slide 4 is situated below the slide 5 and has at the front end of its gauge arm 4a (the back arm) a back support 22 provided with a vertical guide 23 for the back measuring tape 20, which extends therethrough. In front of the back support there is a breast support 24 at the end of a horizontal gauge arm 25 slidable in a guide at the top of a graduated vertical bar 26, which is telescopically shiftable in a pillar 27 attached to the foot plate 2.

Pushed down to a lower position the breast support may also be used for measuring the waist and then coacts with a waist support 28 attached to the waist arm 3a carried by the slide 3 on the standard 1. The waist support carries a measuring tape with a scale 29 for the measuring of the circumference of the waist.

The foot plate 2 for the standard and the pillar is to be placed exactly horizontally by support screws and spirit-levels. The foot plate is crossruled on the surface and provided with graduations and heel spots 30 to fix the position of the feet.

In carrying out the measuring, for instance for a man's clothes, the man stands on the foot plate with his back turned towards the standard 1 and his heels against the stops. The neck arm 5a is raised to the height corresponding to the neck with the position of the fixed point 16a for instance approximately where the inclined shoulder lines cross each other at the back of the neck, and the upper arm 6a is positioned to measure the height of the man. The man has to maintain his standing position during the whole measuring time, and to facilitate this standing supports, not shown in the drawing, may be used for the head and the arm pits. In this position the back of the man's neck is leaning against the neck support, and the measuring arms 17a, 17b of the support are forced by a turning of the shaft 18 to grip around the neck, and are preferably maintained in position for instance by a ratchet wheel and pawl for the shaft 18 of known construction (not shown). Then the shoulder plates 13a, 13b are shifted to the right position and inclination by shifting the slides 9a, 9b, the gauge arms 10a, 10b and the rods 12a, 12b, as well as by the turning of each plate on either or both of its pins 14, 15. All shoulder measurings may be read off accurately in reference to the fixed point 16a independently of whether the two shoulders have different inclinations or different height above the foot plate. Then the supports 22 and 24 for the back and the breast as well as the support for the waist are brought to measuring position, and the thickness of the body in the level of the breast is read off by means of the two firstmentioned supports. By means of the measuring tapes 20 and 21 the curve of the back length from the neck down to the back support 22 and the curve of the breast length from the neck down to the breast support 24 are determined. By the added end portion of the tape the back length between the back support 22 and the waist support 28 also is measured and also the circumference of the waist by means of the tape 29. When the levels of the different standard slides 3, 4, 5 and 6 have been noted all the necessary measurements have been taken in reference to the fixed neck point.

It is to be especially noted that the measuring equipment takes full consideration of different body forms and of abnormal shoulder wryneses and inclinations as well as of different back and breast curves.

To have all the measurements referred to the fixed central neck point will facilitate the procedure as th measuring is divided into main directions, each direction with separate measures which have no tendency to be confused with each other and which all refer back to the said central neck point.

While the preferred form of construction for carrying my invention into effect has been illustrated and described, this is capable of variation and modification without departing from the spirit of the invention.

I claim:

1. In a measuring equipment of the class described, in combination a vertical standard including a supporting foot plate, a plurality of measuring elements slidable upon said standard, one of said measuring elements comprising a forwardly directed horizontally shiftable gauge arm including a neck support arranged to locate various points on a person with reference to a point on the neck support, said neck support having arms to position the neck of the person, independent measuring elements carried by the neck support for the person's shoulders, back and breast, the measuring elements for the shoulders consisting of shoulder plates, each plate being carried by a separate arm system independent of the other, the arms extending at right angles to each other, one horizontal and laterally directed arm of the system being attached to the neck support and the other arms being movable with respect thereto, each said shoulder plate being tiltably connected with the lower end of the vertical arm of the system, the free ends of the two shoulder plates being directed generally towards each other.

2. In a measuring equipment of the class described, in combination a vertical standard including a supporting foot plate, a plurality of measuring elements vertically slidable upon said standard, one of said measuring elements comprising a forwardly directed horizontally shiftable gauge arm including a neck support arranged to locate various points on a person with reference to a point on said neck support, said neck support having arms to hold the neck of the person stationary and independent measuring elements carried by the neck support for the person's shoulders, back and breast, a second of said plurality of measuring elements slidable on said standard being located below said one of said measuring elements and comprises a forwardly directed horizontally shiftable gauge arm terminating in a back support, and a third of said measuring elements slidable on said standard is located below said second of said measuring elements and comprises a forwardly directed horizontally shiftable gauge arm terminating in a waist support, measuring means comprising at least two flexible tapes connected to said neck support arranged to extend one along the back and the other along the curve of the chest of a person being measured, and an auxiliary standard carrying a vertically adjustable head carrying a rearwardly directed horizontally shiftable gauge arm adapted to measure the location of the chest opposite said second of said plurality of measuring elements or of the waist of the person being measured opposite said third of said measuring elements.

3. In a measuring equipment of the class described, in combination a vertical standard including a supporting foot plate, a plurality of measuring elements vertically slidable upon said standard, one of said measuring elements comprising a forwardly directed horizontally shiftable gauge arm including a neck support arranged to located various points on a person with reference to a point on said neck support, said neck support having arms to hold the neck of the person stationary and independent measuring elements carried by the neck support for the person's shoulders, back and breast, said arms to hold the neck of the person stationary each comprising a plurality of links secured together by pivots, a wire secured to the link at the end of the arm and extending through the links to one side of said pivot, a rotatable shaft mounted on said neck support, each said wire secured to said rotatable shaft so that upon rotation thereof said wires will be wound thereon to cause said arms to curve inwardly into neck engaging position.

4. The device of claim 3, in which springs are provided between said links to counteract the action of said wire whereby, upon counter rotation of said shaft, said arms tend to straighten.

5. The device of claim 4, in which said springs are coil springs and said wire extends therethrough.

References Cited in the file of this patent

UNITED STATES PATENTS

| | | |
|---|---|---|
| 826,651 | D'Elia | July 24, 1906 |
| 972,705 | Moritz | Oct. 11, 1910 |
| 1,053,323 | Skrell | Feb. 18, 1913 |
| 1,092,737 | Mennis et al. | Apr. 7, 1914 |
| 2,052,099 | Lytton | Aug. 25, 1936 |
| 2,063,922 | Greenberg | Dec. 15, 1936 |
| 2,784,491 | Sankey | Mar. 12, 1957 |